Jan. 31, 1956 G. F. WALES 2,732,899

APPARATUS FOR SELECTIVE RECORDING

Filed March 20, 1950 4 Sheets-Sheet 1

INVENTOR.
GEORGE F. WALES
BY
Edwin B. Gary
Attorney.

Jan. 31, 1956 G. F. WALES 2,732,899

APPARATUS FOR SELECTIVE RECORDING

Filed March 20, 1950 4 Sheets-Sheet 2

INVENTOR.
GEORGE F. WALES
BY
Edwin B. Gary
Attorney.

Inventor.
GEORGE F. WALES
BY Edwin B. Gary
Attorney.

Jan. 31, 1956 G. F. WALES 2,732,899

APPARATUS FOR SELECTIVE RECORDING

Filed March 20, 1950 4 Sheets-Sheet 4

INVENTOR.
GEORGE F. WALES
BY Edwin B. Gary
Attorney.

United States Patent Office 2,732,899

Patented Jan. 31, 1956

2,732,899

APPARATUS FOR SELECTIVE RECORDING

George F. Wales, Kenmore, N. Y.

Application March 20, 1950, Serial No. 150,668

3 Claims. (Cl. 164—111)

This invention relates to a novel method for recording data on record forms and is also concerned with devices suitable for carrying out said method.

Conventional recording systems for the most part employ a record form which is card-like and which is lined longitudinally (direction in which the record form travels through recording apparatus) and transversely to provide delineated areas within which data may be recorded and to provide coordinates which enable such data to be evaluated. Such a record form may be lined longitudinally to provide one hundred columns across the record form and may be lined transversely to provide ten equal divisions, each of which may be identified by one of the ten digits. A record form so lined provides a total of one thousand delineated and identified areas within which data may be recorded and will, therefore, accommodate most of the data required for present complex business, statistical, government and scientific operations. Such a record form, for example, can be set up to record a purchase order number under ten thousand by utilizing the first four columns. The date, a five digit requirement, would utilize five columns; and a company's code number, amount purchased and other pertinent data may be recorded within the limitations of the remaining of the thousand positions on the record form. For many more complex requirements, a plurality of record forms are utilized. To obtain or compile data from such a record form, a reconciling or tabulating machine is used which measures the coordinates of the indicia from the two edges of the record form, and by reconciling the coordinates of each of the one thousand positions, it compiles the data in accordance with the code which has been previously set up. The existing recording systems, therefore, require complicated mechanical and/or electrical combinations and arrangements because these systems must determine the ordinate and abscissa of each recorded position to obtain the code number which is indicated thereby. This is essentially two operations which is equivalent to passing the record form through tabulating or reconciling apparatus in two directions transverse to each other to first obtain the abscissa and then the ordinate, or vice versa, depending upon the sequence of coordinate determination desired. These two components must then be reconciled to determine the position of the indicia with respect to the one thousand positions on the card and the resultant printed on a continuous record form as legible printed data for vusual interpretaion.

The reconciling machines heretofore employed have of necessity, therefore, required highly skilled set-up technicians as well as trained operators. In addition, such machines have had to be serviced frequently as their complexity has led to frequent maladjustment and breakdown.

Another objection to the present methods of recording is that the apparatus required is costly.

Another limitation with respect to the aforementioned recording methods and apparatus is the lack of flexibility in that standards must be established on the dimensions of the record form and its coordinates so that all record forms and the machines for use therewith will be identical.

Still another objection is the substantial area required on each record form for a small amount of data which thereby necessititates the use of considerable space for storage of such record forms.

The principal object of the present invention is to overcome the aforementioned limitations and objections of existing recording systems and in so doing to provide a more flexible recording method which will enable a multiplicity of similar data to be recorded on and then reconciled from one continuous record form.

Another object is to provide a recording method by which individual cards or a single roll record form may be utilized.

A further object is to reduce the area required for recording a given set of indicia, whereby less area and/or fewer record forms will be required.

A further object is to provide a method of recording in which the set-up of the mechanical recording apparatus is simple and does not require the use of highly skilled operators.

A related object is to provide a method of recording, whereby the apparatus employed for recording or reconciling the data will be simple and not subject to frequent maladjustment and repair.

The invention is illustrated in the accompanying drawings, wherein:

Figure 3 is a top plan view of a portable recording apparatus suitable for preparing the record form shown in the preceding figures and which also illustrates the angular relation above referred to;

Figure 4:
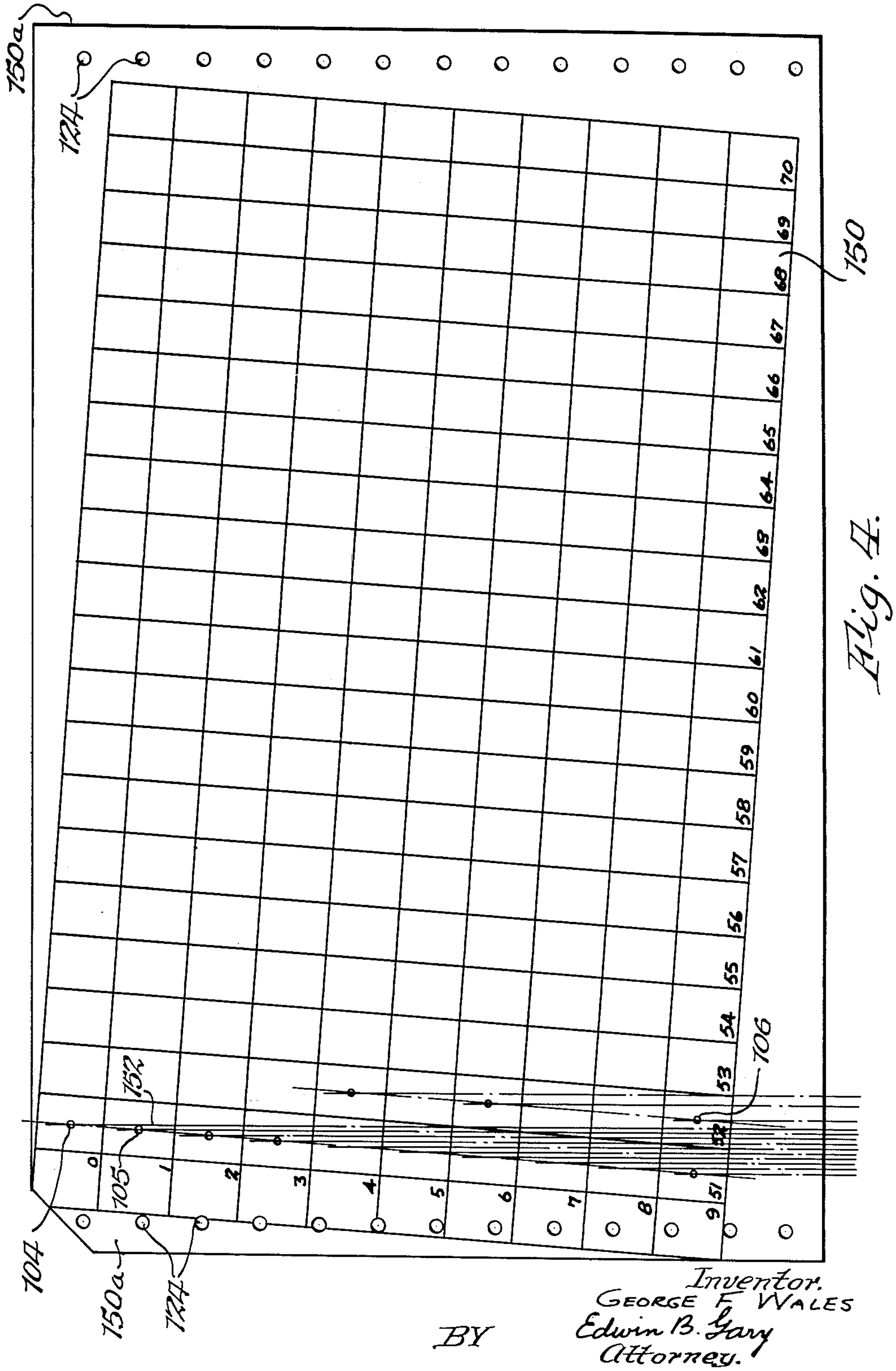
Figure 4 is a face view of a recording card embodying the features of the invention and illustrating the manner in which the data-receiving areas are arranged in columns which extend at an angle with respect to the edges of the card.

In overcoming the objections and limitations above noted and in attaining the objectives referred to, the invention contemplates the guiding of the record form as it is fed through the recording or reconciling machine in such an angular relation with respect to the columnar series of recording or sensing instrumentalities, that each indicia-receiving area on the record form will travel in a different path than the other indicia-receiving areas. For example in Figure 1 the longitudinally and transversely extending lines 30 and 31, respectively, illustrate the positions of the columnar series of the recording or sensing instrumentalities of the recording or reconciling apparatus with relation to one portion of a continuous record form 100, the longitudinally extending lines 30 being parallel and being angularly related with respect to the marginal edges of the record form (which extend in the direction in which the record form is advanced through the recording or reconciling apparatus) and the transversely extending lines 31 being normal to the lines 30. The record from 100 is illustrated as carrying indicia 40, the record form being perforated for this purpose to record in accordance with a predetermined code data which may subsequently be reconciled by feeding the record form through a reconciling machine. As shown in details in Figure 2, as a result of the angular relation between the column of digits of the recording apparatus (axis indicated at 102) and the direction of feed 103 of the record form, only one digit will be recorded in any one location across the record form 100. Thus indicia 104, in column 152 (see also Figure 4), will represent only one number in recording or reconciling the data on record 100 or card 150 (Figure 4) and it will miss the elements for recording or reconciling digits 105 and 106 as the record form passes through the recording or reconciling apparatus. Record forms in the nature of standard business record cards, such as card 150 shown in Figure 4 or record strips such as the record form 100 shown in Figure 2, may be used with equal facility in the same recording and reconciling apparatus.

Figures 1, 2:
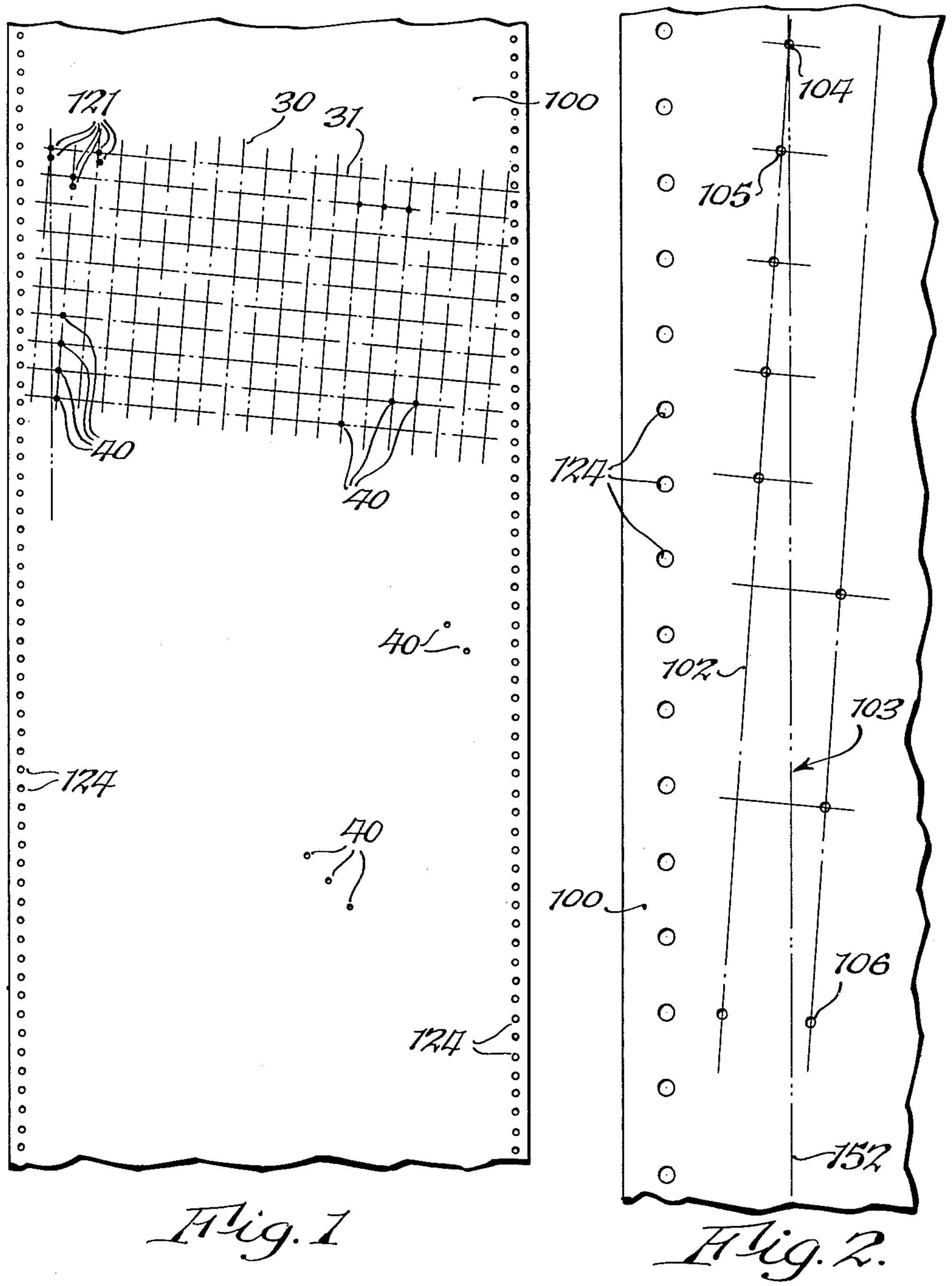
Figure 1 is a face view of a continuous record form on which a plurality of data have been recorded by means of indicia in the form of perforations and which has been lined to illustrate the position of recording or reconciling apparatus over one portion of the record form.
Figure 2 is an enlarged fragmentary view of the continuous record form of Figure 1, illustrating a ten-digit segment thereof and the angular relation of the reconciling or recording apparatus with respect to the direction of feed of the record form.

Referring to Figure 1, it will be noted that the number 121 is shown twice in the first three columns of the record form 100 within extremely close distances of each other, the distance between the first number 121 and the second number representing the amount of feed increment for the record form. It will be apparent, therefore, that a multiplicity of data can be represented by indicia within the areas delineated by the lines 30 and 31 whereas with known card systems the number 121 could only be indicated, at most, twice within the confines of the space shown. Thus, if the indicia were one thirty-second inch in diameter and the horizontal distance were four inches (assuming a feed increment of one-eighth inch), the number 121 could be repeated approximately thirty times in the space where heretofore it could only be represented, at most, twice. An advantage attained, therefore, is that a greater amount of data may be recorded within a given space than has been possible heretofore. It will also be apparent that as the feed increment is small, a simple feed arrangement and a simple indicia-producing machine such as will be described hereinafter may be employed, which can actually be used in the shop, whereas with the systems in use heretofore, the machines are very large and heavy, and are wholly impractical for shop use. Moreover, even if it were feasible to employ previously known machines in the shop, the large feed increment required would make it difficult to hand feed the cards with any rapidity or accuracy, thus lowering the utility of hand recording at the source of the data.

Figure 3:
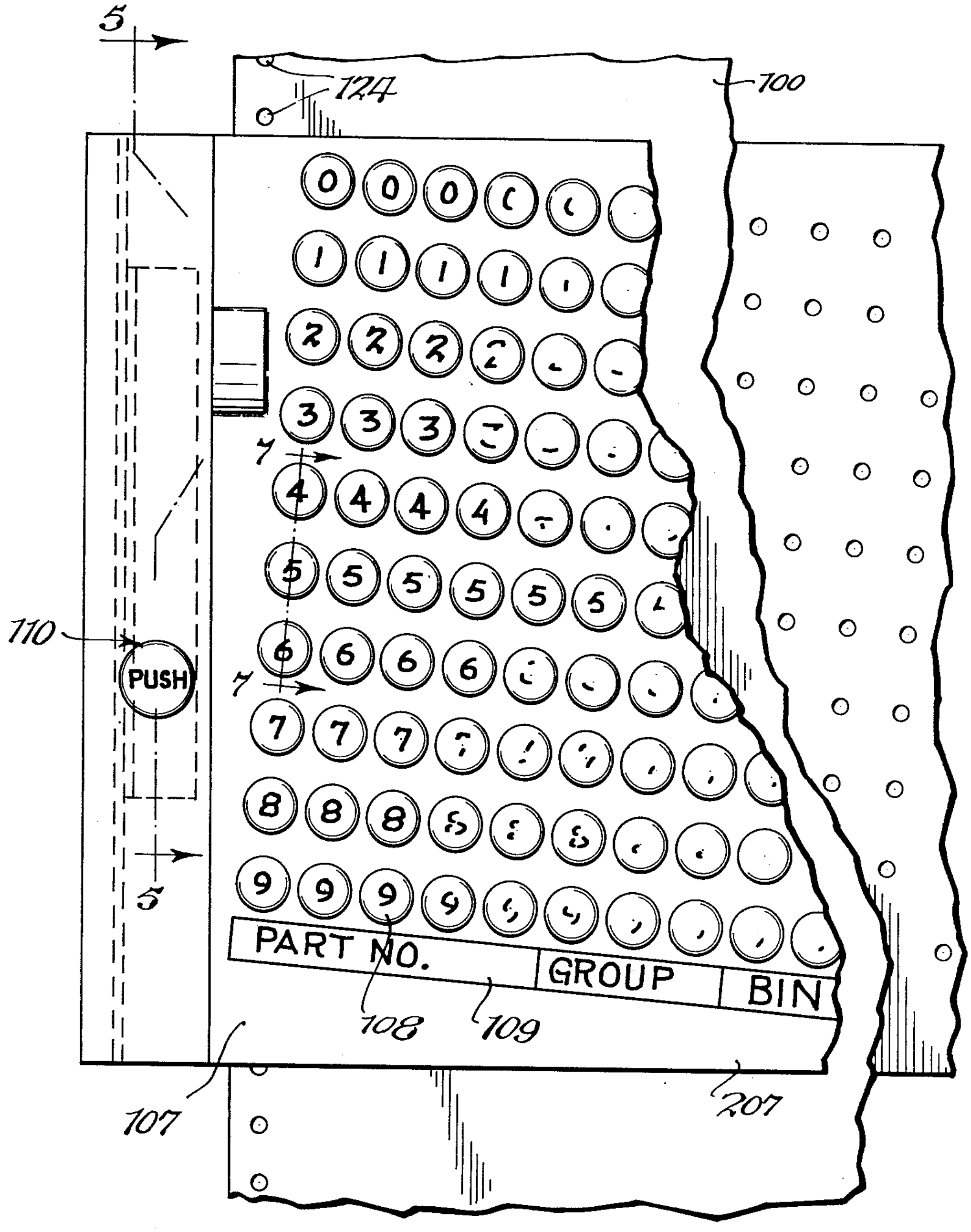

A portable recording apparatus 107 suitable for carrying out the method of the invention is illustrated in Figure 3. As will be noted, the keyboard 108 of the apparatus represents the code chosen for the particular inventory problem at hand as presented by the insert card 109. The feed mechanism which is indicated generally at 110 is adapted to feed a record strip 100 (Figures 1 and 2) or record card 150 (Figure 4) step-by-step in arcuate predetermined increments. It will be noted that the inventory represented by the illustrated code may be taken directly on the recorder and the record strip then transferred to a suitable machine for tabulating or reconciling purposes.

The same apparatus for recording or reconciling may be employed in connection with the record card 150 as with the strip-like record form 100. The card 150 (Figure 4), as illustarted, is lined to provide 20 columns which extend generally in the direction of feed and which are numbered 51 through 70, lines normal to the longitudinally extending lines dividing the columns in the direction of feed into 10 divisions numbered from 0 to 9. It will be noted that the columns numbered 51 through 70, although extending generally in the direction of feed as determined by the guiding edges 150*a* of the card, are angularly related with respect to such guiding edges, and hence the direction of feed. Because of this path of travel of the card through the recording or reconciling apparatus, an indicia 104 in position 0—51 will move along a different path than the indicia in position 1—51 and that in position 9—52. This illustrates that indicia arranged in the same columns on a recording card will actuate or energize only one pick-up or sensing device as it passes through a suitable recording, tabulating or reconciling machine. In other words, each of the two hundred positions illustrated on the card 150 will actuate or energize only one of the pick-up or sensing devices of the recording or reconciling apparatus.

It will be apparent that, while I have chosen to illustrate only two hundred positions on record card 150, due to only twenty longitudinally extending columns, any number of such columns may be utilized and as many as one hundred could probably be used by operators familiar with the cards of the existing systems.

Figures 5, 6, 7:
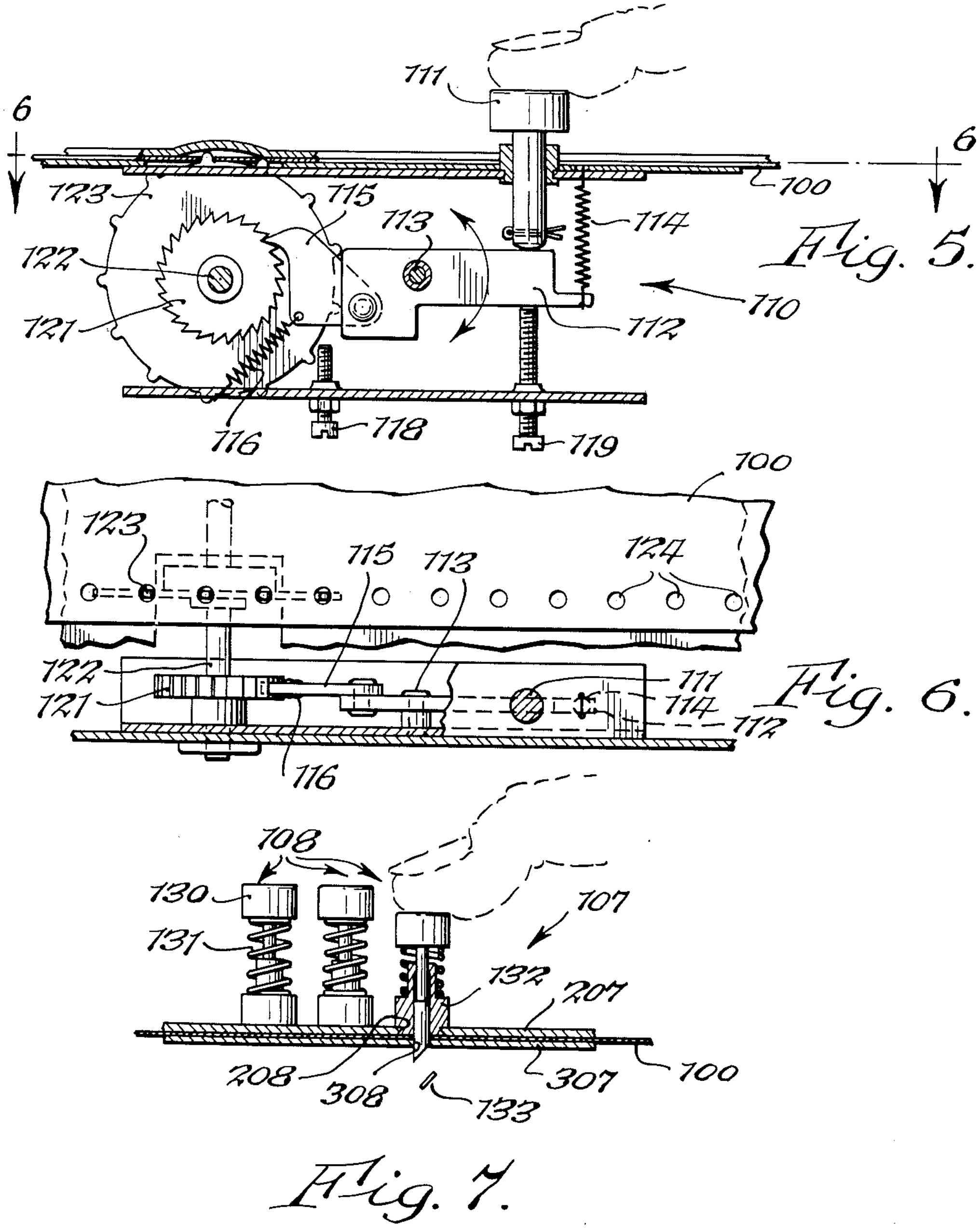
Figure 5 is a detail sectional view taken along line 5—5 of Figure 3 and illustrates the record form driving and engaging means.
Figure 6 is a detail sectional view along line 6—6 of Figure 5.
Figure 7 is a detail sectional view taken along line 7—7 of Figure 3, illustrating indicia-producing elements in the form of punches.

Figures 5 and 6 illustrate the feeding mechanism 110 for the form of recorder 107 shown in Figure 3, for use with the strip or record card. Feed mechanism 110 comprises a push button 111, shown in Figure 5 being actuated, and a lever 112 fulcrumed at 113 and having a return spring 114. To lever 112 is pivotally connected a pawl 115, the latter having a hold engagement spring 116 connected thereto. Adjustable stops 118 and 119 limit feed movement of record 100 to the desired increment. Pawl 115 engages a ratchet wheel 121 affixed to a shaft 122 which is journalled in recorder 107. Shaft 122 drives a pair of spaced sprockets 123 which engage perforated tracks 124 in the record 100 or card 150 to drive it. It will thus be apparent that the feed mechanism 110 drives record 100 or card 150 in small, suitably spaced, predetermined increments so that the indicia produced on the record will have the desired spacing, as described heretofore.

In Figure 7, I have illustrated one particular means for producing indicia on the record form. As shown in this figure, and in Figure 3, recorder 107 has a top plate 207 in which a plurality of button assemblies 108 are suitably secured. Each button assembly 108 includes a button headed punch 130, a stripping spring 131 and a guide member 132 which is suitable for fastening the assembly 108 to the top guide plate 207 through aperture 208 in the latter. It will be noted that a bottom die plate 307 is formed with a plurality of die apertures 308 which are in axial alignment with guide apertures 208 so that headed punch 130 will be in alignment with die aperture 308 and may be depressed, as illustrated, to punch slugs 133 out of record 100 as is shown in Figure 7 and thereby produce indicia in the form of perforations.

From the foregoing, it will be apparent that I have invented a new and novel system of recording which possesses a high degree of flexibility and which enables the attainment of numerous advantages not possible heretofore with methods and apparatus of the prior art. It will also be apparent that my method of recording is, at the same time, available for the recording of data for any requirement for which the systems in use now are employed, although not as limited as such systems with respect to the kind of record from utilized.

I claim as my invention:

1. Recording apparatus of the character described, comprising a plurality of indicia-producing elements which are arranged in a plurality of equi-spaced columns and in equi-spaced relation in each column, thereby to constitute a plurality of parallel rows of indicia-producing elements in which the indicia-producing elements are equi-spaced, the rows extending normal to the columns, means for actuating said elments, and means for feeding a record from through said apparatus in operative relation to said elements and in a direction inclined both to said columns and to said rows so that indicia produced on said record form by each of said elements will travel along a different path from indicia produced by the other elements.

2. Recording apparatus of the character described, comprising a plurality of spaced punches arranged in a plurality of equi-spaced, parallel columns with a plurality of punches in each column that are equi-spaced and that are spaced from one another at the same distance as the punches in the other columns whereby the punches are arranged equi-distantly in a plurality of equi-spaced parallel rows that are normal to the columns, means for actuating the individual punches, and means for feeding a record form step-by-step in predetermined increments through said apparatus and in a direction inclined both to the direction of said columns and to the direction of said rows whereby a hole produced in said record form by one of said punches will travel during feed of the record form through said apparatus along a different path from a hole produced by other punches.

3. Recording apparatus of the character described comprising means for feeding a record from through said apparatus in one direction, and a columnar series of indicia-producing elements, said elements being arranged in a plurality of columns which are inclined to the direction of feed of the record form and in a plurality of rows normal to the columns and also inclined to the direction of feed of the record form, each column comprising at least ten indicia-producing elements, and each row comprising at least ten indicia-producing elements.

References Cited in the file of this patent

UNITED STATES PATENTS

| | | |
|---|---|---|
| 1,366,812 | Krum | Jan. 25, 1921 |
| 2,124,178 | Lasker | July 19, 1938 |
| 2,189,046 | Smith et al. | Feb. 6, 1940 |
| 2,203,355 | Kelley | June 4, 1940 |
| 2,290,827 | Thomas | July 21, 1942 |
| 2,314,718 | Leathers et al. | Mar. 23, 1943 |
| 2,484,642 | Paris | Oct. 11, 1949 |
| 2,493,848 | Ayres | Jan. 10, 1950 |
| 2,583,086 | Carpenter | Jan. 22, 1952 |